Aug. 2, 1927.
G. W. SHAW
CIRCUIT CLOSER
Filed Feb. 1, 1923
1,637,837
4 Sheets-Sheet 3
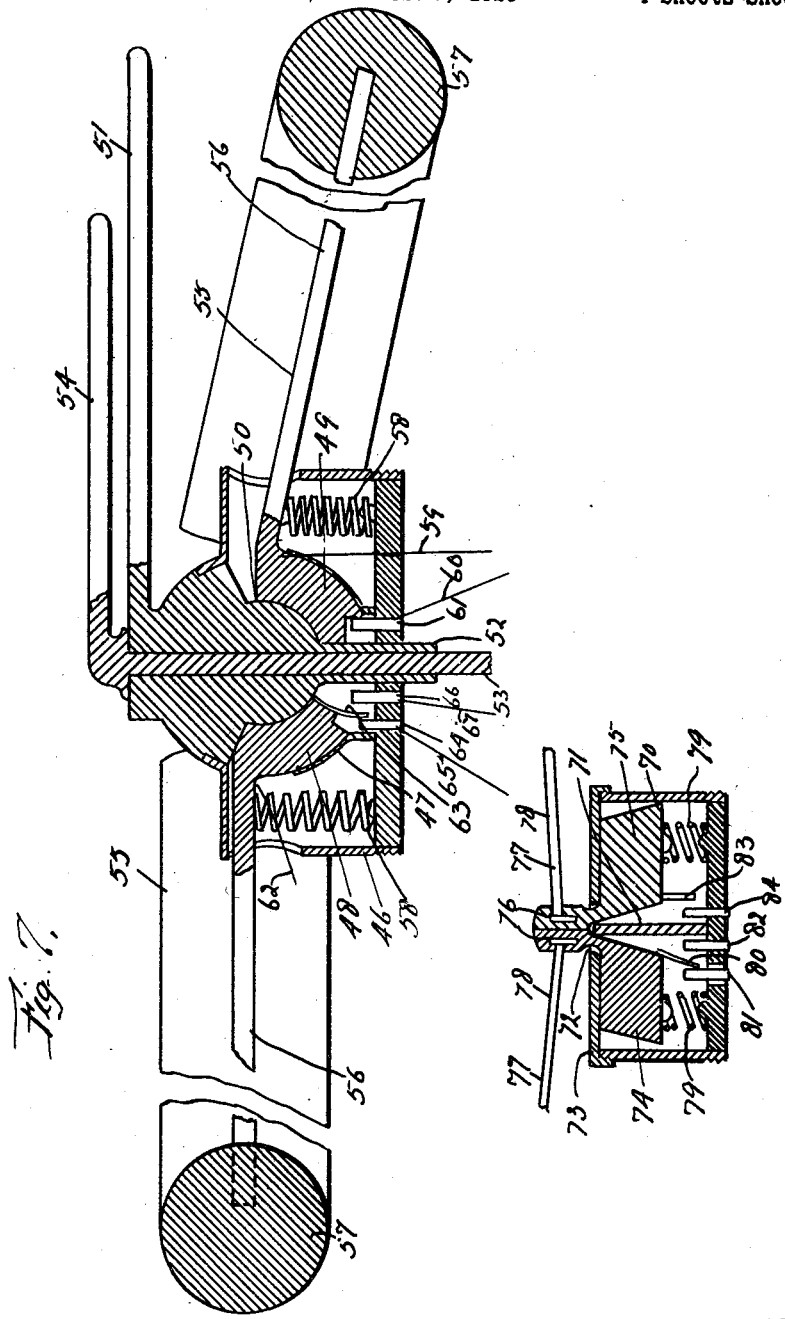
INVENTOR
George W. Shaw
W. W. Williamson
Atty.

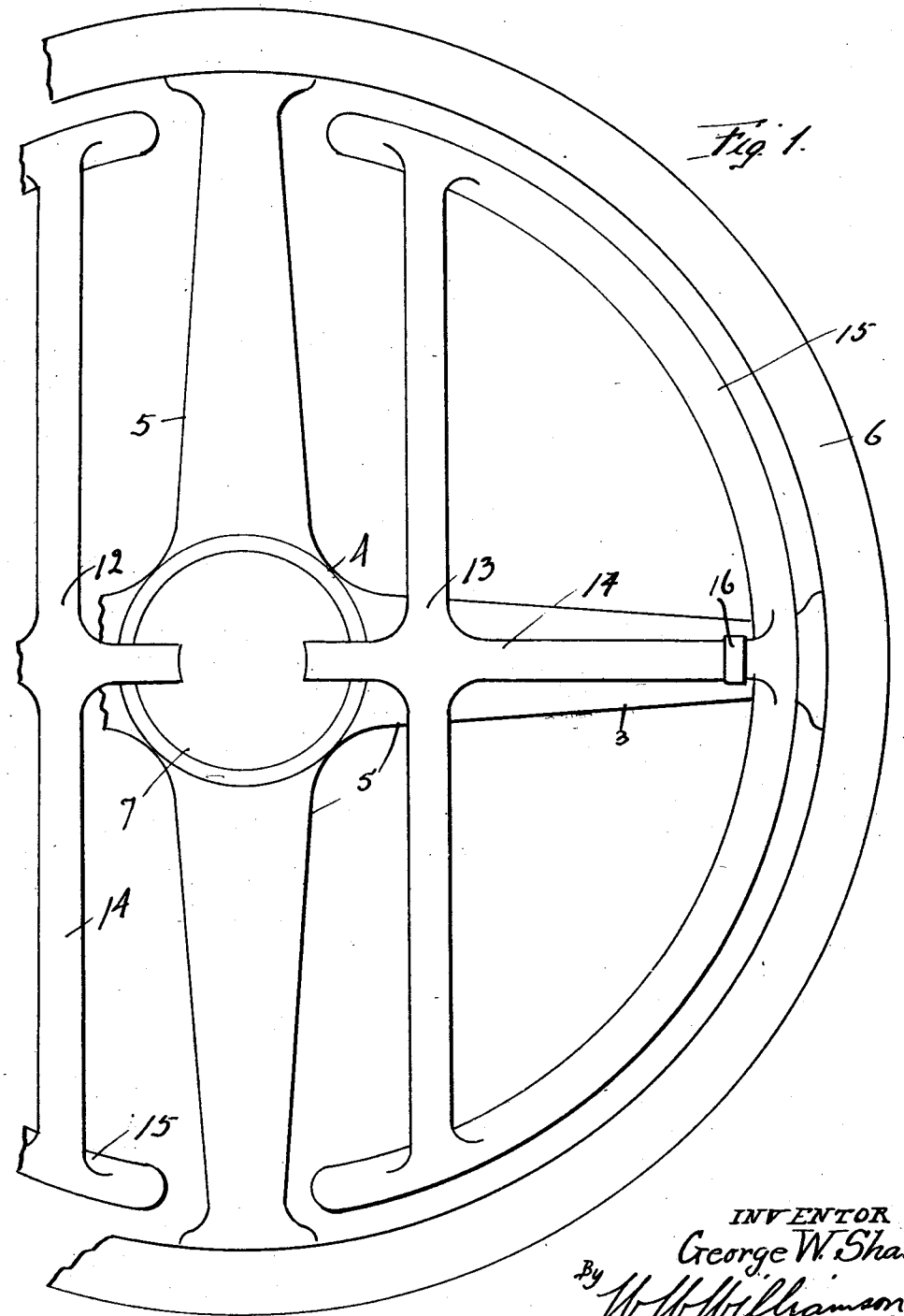

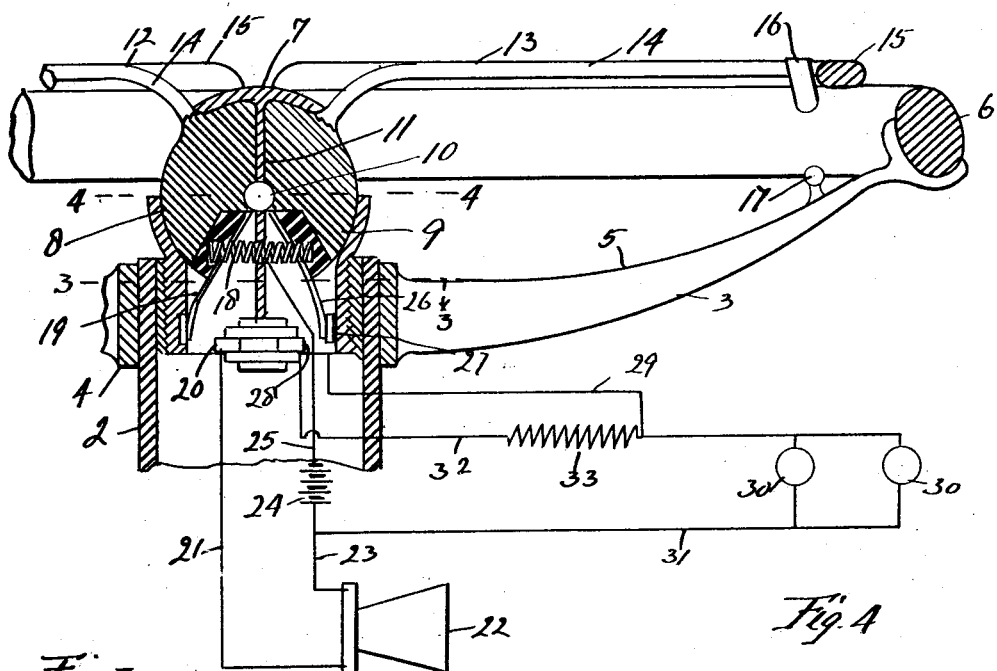

Aug. 2, 1927.

G. W. SHAW 1,637,837

CIRCUIT CLOSER

Filed Feb. 1, 1923

INVENTOR
George W. Shaw
By W. W. Williamson
Atty.

Patented Aug. 2, 1927.

1,637,837

UNITED STATES PATENT OFFICE.

GEORGE W. SHAW, OF PHILADELPHIA, PENNSYLVANIA.

CIRCUIT CLOSER.

Application filed February 1, 1923. Serial No. 616,281.

My invention relates to new and useful improvements in a circuit closer, and has for its primary object the provision of a simple and effective means for controlling the circuit through an audible or visible electric alarm or signal.

Another object of the invention is to provide a structure of this character wherein the operating member or members extend approximately around at least one-half of the steering wheel of an automobile so as to be readily accessible regardless of the position of said steering wheel.

A further object of the invention is to provide an oscillating member adapted to be mounted upon the steering column and provided with suitable contact members for controlling different electrical circuits, said oscillating member having means arranged adjacent the rim of the steering wheel whereby it may be readily actuated by the hand of the operator without removing the same from the steering wheel.

A still further object of the invention is to generally improve the construction and arrangement of devices of this general description.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a fragmentary plan view of an automobile steering wheel assembly showing my invention applied thereto.

Fig. 2, is a fragmentary vertical sectional view thereof with a diagram of the electrical circuits connected with certain signal devices.

Fig. 3, is a section at the line 3—3 of Fig. 2.

Fig. 4, is a section at the line 4—4 of Fig. 2.

Fig. 5, is a detail sectional side elevation of a spring clamp for holding an operating member in a certain temporary position.

Fig. 6, is a similar view of the complementary holding member.

Fig. 7, is a similar view of a different form of the invention with one of the oscillating members in its normal position and the other in an operative position.

Fig. 8, is a fragmentary sectional view of another modification.

Figure 9:
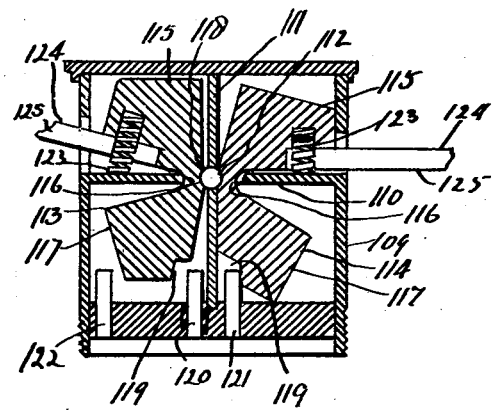

Fig. 9, likewise is a similar view of a still further modified form.

In carrying out my invention as embodied in Figs. 1 to 6 inclusive, 2 represents a steering post of ordinary or any desirable construction to which is fixed the steering wheel 3 comprising a hub 4, spokes 5 and rim 6.

In some suitable manner a cage or housing 7 is secured to the steering post or column and within this cage or housing are movably mounted the oscillating members 8 and 9, here shown as segments of a sphere actuating about a ball 10 carried by the depending bracket 11 located within the cage or housing and preferably formed as an integral part thereof.

The oscillating members 8 and 9 each carry an actuating member 12 and 13 respectively, each of said actuating members consisting of a suitable framework or spokes 14 and an arcuate hand portion 15 corresponding substantially to one-half of the rim 6 of the steering wheel adjacent to which they are located so as to be readily reached by the hands of the operator without the necessity of removing the hands from the steering wheel and one of these actuating members carries one of the elements 16, such as a spring socket, of a temporary holding means while the steering wheel carries the other or complementary member 17 of said temporary holding device, said complementary member in this case being a stud. This temporary holding means will hold the actuating member 13 in a depressed position for a temporary period or until such time as the operator moves the actuating member upward a sufficient distance to disengage the element 16 from the element 17.

The oscillating members 8 and 9 are normally held in the positions shown in Fig. 2 by means of a spring or springs 18 which engage the two oscillating members when only one spring is used but where two springs are used they engage the bracket 11 in addition to the oscillating members.

One of the oscillating members, as 8, carries a contact member 19 suitably insulated therefrom which when the oscillating member is actuated is adapted to engage a contact member 20 from which leads a conductor 21 to a signaling device 22 such as an electrically actuated horn and from this signaling device leads another conductor 23 to the source of electrical energy 24 such as a battery while from this source of electrical energy leads another conductor 25 to the bracket 11 the current being carried by said bracket and the spring 18 to the contact member 19 thereby completing the circuit for actuating the signaling device 22.

The other oscillating member, as 9, carries a contact member 26 which is adapted to engage either the contact 27 when said oscillating member is in its normal position or the contact member 28 when moved by the depression of the actuating member 13. From the contact member 27 leads a conductor 29 to one of the poles of each of the electric lamps 30 while from the other pole of each of said lamps leads a conductor 31 to one side of the source of electrical energy or battery 24 the balance of the circuit for said lamps including the conductor 25, bracket 11 and spring 18. From the contact member 28 leads a conductor 32 to one side of a suitable resistance 33 while the other side is connected with some portion of the conductor 29 for connection with the lamps 30 while the balance of the circuit is the same as hereinbefore described. From this it will be seen that so long as the oscillating member 9 is in its normal position the electric current may pass through the lamps 30 but when its actuating member 13 is depressed this circuit will be broken and a new one set up through the conductor 32 and the resistance 33 thus diminishing the current passing through the lamps so that they will be dimmed which is advantageous when traveling through congested traffic.

In traveling along poorly lighted roads it is desirable to have very strong lights except when passing other vehicles so that by slightly depressing the actuating member 13 the resistance 33 will be cut in and thus dim the lights but as soon as the actuating member is released the spring 18 will return the parts to their normal positions but when traveling along a road that is well lighted such as a city street, the lights should remain dimmed and this may be accomplished by depressing the actuating member 13 sufficiently to cause the element 16 of the temporary holding device to engage the element 17 thus holding the actuating member 13 in a depressed condition the desired length of time without an operator's hand being continually upon the same.

As the hand portion 15 of each actuating member extends substantially half way around the steering wheel rim said hand portions will always be within easy access of the operator's hands regardless of the position of the steering wheel eliminating the necessity of removing the hands from the steering wheel for operating said actuating members thus greatly reducing the possibility of accidents.

In Fig. 7 is illustrated a casing or housing 46 to be mounted upon the top of the steering column having a socket portion 47 in which are movably mounted the oscillating members 48 and 49 which are guided by and operate about the head 50 of the throttle lever 51, said head having a tube 52 passing down through the steering column and within this tube is mounted the stem 53 of the spark advancing mechanism and this stem carries the spark lever 54.

Each of the oscillating members 48 and 49 carries an actuating member 55 consisting of the spider 56 and the arcuate portion 57 and each of these actuating members is held in its normal position by a spring 58 as shown with relation to the oscillating member 48.

One side of the electrical circuit connected with the audible signaling device is represented by the conductor 59 connected in any suitable manner with the oscillating member 49 while the other side of the circuit represented by the conductor 60 is connected to the contact member 61 with which the oscillating member 49 coacts to close the circuit while one side of another circuit represented by the conductor 62 is connected with the other oscillating member 48 carrying a contact member 63 for engagement with the contact member 64 to which leads the conductor 65 of the other side of the full circuit or the contact member 66 to which leads the conductor 67 of the other side of the dimmer circuit.

When the actuating member of the oscillating member 49 is depressed as shown the electrical circuit will be completed or operated in the signaling device and as soon as the pressure on the actuating member is released this spring 58 will return the parts to their normal position. Likewise when the actuating member of the oscillating member 48 is depressed the dimmer circuit will be closed so that the lights will be reduced in intensity but as soon as the pressure on the actuating member is released the parts will be returned to the position shown by the other spring 58 thereby completing the circuit through the unobstructed line so that the lights will give forth their full power.

In Fig. 8, I have shown another form of my invention wherein 70 represents a housing or casing for attachment to a steering column and this casing carries an upright 71 aligning with a hole 72 in the cap 73 of the casing and on this upright 71 are fulcrumed the oscillating members 74 and 75 each of said oscillating members having an extension 76 projecting through the hole 72 and each of these extensions carries an actuating member 77, the spiders 78 of which are shown, the balance of the actuating members being similar to that above described shown in Figs. 1 and 7.

These oscillating members are held in their normal positions by springs 79 arranged beneath said members between them and some suitable portion of the housing.

One of the oscillating members, as 74, carries a contact member 80 for engagement with either of the contacts 81 and 82 connected with the electrical circuits as hereinbefore described, while the other oscillating member 75 carries a contact 83 for coaction with the contact 84 which are connected with another electrical circuit as before described.

In Fig. 9, I have illustrated a slight variation of the structure wherein the casing or housing 109 which is mounted upon the steering column is provided with a plurality of inwardly projecting supporting fingers 110 intermediate its height, thus separating the interior of the casing, to some extent, into two compartments while the inner ends of said supporting fingers are spaced apart. Within the casing or housing is located a longitudinal or vertical bracket 111 which passes through the space between the supporting fingers and carries a ball 112 located within the space between said supporting fingers.

Within the casing are located the oscillating members 113 and 114 one of which is on each side of the bracket 111 and each of these oscillating members comprises a head 115 adapted to work within that portion of the casing above the supporting fingers, a reduced neck 116 within the space between the supporting fingers, and a body 117 working within that portion of the casing below the supporting fingers. Each of these oscillating members also has an arcuate recess 118 in the region of the neck portion for coaction with the ball 112. Further the oscillating members have notches or recesses 119 into which project the contact members 120 and 121 the latter coacting with the oscillating member 114 and being connected with one side of an electrical circuit leading to a signaling device while the oscillating member 114 is connected with the other side of said circuit so that when depressed as shown the circuit will be closed. The contact 120 is connected to one side of a dimmer circuit while another contact 122 is connected to one side of the full light circuit and the oscillating member 113 which coacts with both of these last named contacts and is connected with the other side of the light circuit.

In order to hold the oscillating members in their normal positions which is the position in which the member 113 is shown, I provide a spring 123 for each oscillating member which coacts with the heads thereof as the movable elements and with the supporting fingers 110 as the stationary members and these oscillating members carry the actuating members 124 similar to those above described, the spiders 125 of which are shown.

Of course I do not wish to be limited to the exact details of construction as herein shown as these may be varied within the limits of the appended claims without departing from the spirit of my invention.

Having thus fully described my invention, what I claim as new and useful is:—

1. A circuit closer including a casing mounted upon the column of a steering wheel assembly, oscillating members within said casing and an actuating member carried by each of the oscillating members, said actuating members including arcuate hand portions extending around two opposite portions of the steering wheel concentric therewith.

2. The combination with a steering wheel assembly including a steering wheel and a steering column on which it is mounted, of a casing supported by the column, oscillating members located within the casing, an actuating member carried by each of the oscillating members and including a spider and a hand portion extending around substantially one-half of the circumference of the steering wheel in proximity to the rim thereof, means for maintaining the oscillating members in a normal position, contact members carried by the oscillating members and connected with one side of electric circuits, a contact member within the casing connected with the other side of one circuit for coaction with the contact member of one of the oscillating members a pair of other contact members within the casing with which the contact of the other oscillating member coacts when the oscillating member is in different positions, one of the last named contacts being connected with the other side of the second circuit and the other of said last named contacts being connected with the third circuit.

3. The combination with a steering wheel assembly including a steering column and a steering wheel thereon, of a casing supported by the column, a contact member within the casing and connected with one side of an electric circuit, an oscillating member mounted within the casing, a contact member carried by said oscillating member connected with the other side of the electric circuit and operatively engageable with the first named contact member for closing the circuit, a spring for normally holding the oscillating member in a position to hold the contacts out of engagement, and an actuating member carried by the oscillating member, said actuating member comprising a spider projecting toward the rim of the steering wheel, and an arcuate hand portion coinciding with the curvature of the steering wheel and extending around substantially one-half thereof.

4. The combination with a steering wheel assembly including a steering column, a steering wheel, a throttle lever having a head, a portion of which is of circular formation and a spark lever having a shank passing through the head of the throttle lever, of a casing mounted upon the steering column and surrounding portions of said levers, said casing having a socket therein, oscillating members mounted within the socket portion of the casing and operable about the circular portion of the throttle lever, means for actuating said oscillating members comprising spiders and hand portions carried by said spiders, said hand portions extending around substantially one-half of the steering wheel diametrically opposite each other and coinciding with the curvature of said steering wheel, and means for maintaining the oscillating members with their component parts in their normal positions.

5. The combination with a steering wheel assembly including a steering column, a steering wheel, a throttle lever having a head, a portion of which is of circular formation and a spark lever having a shank passing through the head of the throttle lever, of a casing mounted upon the steering column and surrounding portions of said levers, said casing having a socket therein, oscillating members mounted within the socket portion of the casing and operable about the circular portion of the throttle lever, means for actuating said oscillating members comprising spiders and hand portions carried by said spiders, said hand portions extending around substantially one-half of the steering wheel diametrically opposite each other and coinciding with the curvature of said steering wheel, springs located within the casing and engaging portions of said casing and the actuating members for normally forcing them in an upward direction, and contact members located within the casing and connected with one side of an electric circuit with which the oscillating members are operatively engageable for closing circuits to the other sides of which they are connected.

In testimony whereof, I have hereunto affixed my signature.

GEORGE W. SHAW.